US012745701B2

(12) United States Patent
Carpenedo

(10) Patent No.: US 12,745,701 B2
(45) Date of Patent: Sep. 29, 2026

(54) ADJUSTABLE CROP RESIDUE SPREADER FOR AGRICULTURAL HARVESTER

(71) Applicant: AGCO DO BRASIL SOLUÇÕES AGRÍCOLAS LTDA, Ribeireo Preto (BR)

(72) Inventor: Marcelo Carpenedo, Sapucaia do Sul (BR)

(73) Assignee: AGCO do Brasil Soluções Agrícolas Ltda., Riveirao Preto (BR)

( * ) Notice: Subject to any disclaimer, the term of this patent is extended or adjusted under 35 U.S.C. 154(b) by 375 days.

(21) Appl. No.: 18/512,458

(22) Filed: Nov. 17, 2023

(65) Prior Publication Data

US 2024/0215484 A1 Jul. 4, 2024

(30) Foreign Application Priority Data

Dec. 29, 2022 (GB) ..................................... 2219834

(51) Int. Cl.
*A01D 41/12* (2006.01)
*A01D 41/127* (2006.01)

(52) U.S. Cl.
CPC ....... *A01D 41/127* (2013.01); *A01D 41/1243* (2013.01)

(58) Field of Classification Search
CPC .......................... A01D 41/127; A01D 41/1243
See application file for complete search history.

(56) References Cited

U.S. PATENT DOCUMENTS

| | | | | |
|---|---|---|---|---|
| 8,463,510 | B2 * | 6/2013 | Knapp | A01D 41/127 701/50 |
| 11,647,694 | B2 * | 5/2023 | Bussmann | A01D 41/1243 460/80 |
| 12,495,732 | B2 * | 12/2025 | Deruyter | A01D 41/1243 |
| 2003/0109293 | A1 | 6/2003 | Wolters | |
| 2011/0093169 | A1 * | 4/2011 | Schroeder | A01D 41/1243 701/50 |
| 2011/0130181 | A1 * | 6/2011 | Roberge | A01D 41/1243 460/111 |
| 2013/0095899 | A1 * | 4/2013 | Knapp | A01D 41/127 460/111 |
| 2013/0324199 | A1 * | 12/2013 | Roberge | A01D 41/1243 460/111 |
| 2017/0142900 | A1 * | 5/2017 | Mahieu | A01D 41/1243 |
| 2018/0084718 | A1 * | 3/2018 | Baumgarten | A01D 41/1243 |

(Continued)

OTHER PUBLICATIONS

UK Intellectual Property Office, Search report for related UK Application No. GB2219834.5, dated Jun. 9, 2023, 4 pages.

*Primary Examiner* — Jess Whittington

(57) ABSTRACT

A control system for controlling operation of one or more operational components of a crop residue spreader arrangement of an agricultural harvester is disclosed. The control system comprises one or more controllers, and is configured to: receive data indicative of a detected distribution of crop residue located on the ground behind the crop residue spreader arrangement; determine, in dependence on the detected distribution, a spreading strategy for operation of one or more operational components of the crop residue spreader arrangement, and generate and output one or more control signals for controlling the one or more operational components of the crop residue spreader arrangement in dependence on the determined spreading strategy.

14 Claims, 8 Drawing Sheets

(56) References Cited

U.S. PATENT DOCUMENTS

| | | | | |
|---|---|---|---|---|
| 2022/0174873 | A1* | 6/2022 | Topmöller | A01D 41/1271 |
| 2022/0369554 | A1* | 11/2022 | Christiansen | A01D 41/1243 |
| 2022/0394923 | A1* | 12/2022 | Christiansen | A01D 41/127 |
| 2023/0225246 | A1* | 7/2023 | Leenknegt | A01D 41/1243 460/1 |

* cited by examiner

ADJUSTABLE CROP RESIDUE SPREADER FOR AGRICULTURAL HARVESTER

FIELD

The present invention relates to a control system for agricultural harvesters such as combine harvesters, and, more particularly, to a control system for a crop residue spreader arrangement for spreading crop residue over the ground behind the agricultural harvester.

BACKGROUND

For many decades, self-propelled combine harvesters have been used by farmers to harvest a wide range of crops including cereals, maize and oil-seed rape. Typically, a combine harvester cuts the crop material, threshes the grain (or seed) therefrom, separates the grain from the straw, and cleans the grain before storing in an on-board tank. Straw and crop residue is ejected from the rear of the machine.

It is well known to fit combine harvesters with a cutting machine such as a straw chopper at the rear of the machine for chopping the straw ejected from the separating apparatus. Depending on the requirements of the farmer, the straw is either deposited directly onto the ground in windrows for subsequent baling and removal, or chopped and spread onto the field behind the combine for incorporation back into the soil. Means to direct the straw onto the ground typically comprises a tailboard or spreader arrangement incorporating a pair of counter rotating spreader wheels. While known tailboard arrangements are moveable as a whole, they are of fixed shape, thereby imposing a limitation as to the spreading obtained that does not account for variations in harvesting conditions (such as yield, moisture or wind). While individual tailboards can be replaced to account for harvesting conditions, this is a time consuming task and one not considered worthwhile as during the time taken to effect such a change the harvesting conditions will likely have changed.

Variables such as the field's terrain, cutting height and wind direction can affect the final placement of the crop residue. Farmers want the spread width to be quickly and independently adjustable left to right whilst still maintaining an even distribution of straw and crop residue across the field.

It is an advantage of the present invention that consistent crop residue spreading is addressed. It is an object of the invention to provide controlled spread width together with side to side compensation without reducing the speed of the counter rotating spreader wheels.

BRIEF SUMMARY

According to a first aspect of the present invention, a control system for controlling operation of one or more operational components of a crop residue spreader arrangement of an agricultural harvester, the control system comprising one or more controllers, and being configured to: receive data indicative of a detected distribution of crop residue located on the ground behind the crop residue spreader arrangement; determine, in dependence on the detected distribution, a spreading strategy for operation of one or more operational components of the crop residue spreader arrangement, and generate and output one or more control signals for controlling the one or more operational components of the crop residue spreader arrangement in dependence on the determined spreading strategy, wherein the one or more operational components may comprise actuators for the displacement of individual vertically displaceable elements making up the first and second residue spreaders of the crop residue spreader arrangement.

The control system may be configured to generate and output one or more control signals for controlling operation of the actuators to displace one or more of the individual vertically displaceable elements in accordance with the determined spreading strategy.

The one or more operational components may additionally comprise a user interface, such as a display screen. The control system may be configured to generate and output one or more control signals for controlling operation of the user interface to display the determined spreading strategy to an operator of the agricultural harvester.

The control system may be configured to: receive sensor data from sensors associated with the crop residue spreader arrangement; and determine a spreading characteristic of the crop residue in dependence thereon. The sensors may comprise one or more of: an optical sensor, a lidar scanner, a radar scanner, or a laser scanner. The sensors may be mounted or otherwise coupled to the crop residue spreader arrangement or the agricultural harvester and configured to monitor crop residue spread by the crop residue spreader arrangement.

According to a second aspect of the invention there is provided a system, comprising: a crop residue spreader arrangement; and a control system according to the first aspect of the invention configured to control operation of the crop residue spreader arrangement in accordance with a determined spreading strategy.

According to a third aspect of the invention there is provided an agricultural harvester comprising and/or being controllable by a control system, or comprising a system as described herein with reference to any preceding aspect of the invention.

A fourth aspect of the invention provides a method of controlling operation of one or more operational components of an agricultural harvester, comprising: receiving data indicative of a spreading characteristic of crop residue deposited by the agricultural harvester; determining, in dependence on the spreading characteristic, a spreading strategy for depositing the crop residue, the spreading strategy including an indication of the spreading strategy; and controlling one or more operational components associated with the agricultural harvester in dependence on the determined spreading strategy, wherein the one or more operational components may comprise actuators for the displacement of individual vertically displaceable elements making up the first and second residue spreaders of the crop residue spreader arrangement.

The control system may be configured to generate and output one or more control signals for controlling operation of the actuators to displace one or more of individual vertically displaceable elements in accordance with the determined spreading strategy.

The one or more operational components may additionally comprise a user interface, such as a display screen. The user interface may be operable to provide information indicative of the determined spreading strategy to an operator of the agricultural harvester. The method may include controlling operation of the user interface to display the determined spreading strategy to an operator of the agricultural harvester.

The method may include: receiving sensor data from sensors associated with the agricultural harvester; and determining a spreading strategy of the crop residue in dependence thereon. The sensors may comprise one or more of: an optical sensor, a lidar sensor, a radar sensor, or a laser sensor. The sensors may be mounted or otherwise coupled to the crop residue spreader arrangement or the agricultural harvester and configured to monitor crop residue spread by the crop residue spreader arrangement.

A further aspect of the invention provides computer software comprising computer-readable instructions which, when executed by a processor, cause performance of a method in accordance with the preceding aspect of the invention.

A yet further aspect of the invention provides a non-transitory computer readable storage medium comprising the computer software of the preceding aspect of the invention.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The invention will now be described, by way of example only, with reference to the accompanying drawings, in which.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Relative terms such as forward, rearward, transverse, lateral, longitudinal and sideways will be made with reference to the normal forward direction of travel of the combine 10 and indicated by arrow F represented in FIG. 1. The terms vertical and horizontal will be made with reference to the level ground 101 upon which the combine 10 is disposed. In other words the Cartesian axes of 'longitudinal', 'transverse', and 'vertical' are made in relation to the frame 12 of combine 10 and are not affected by any slope in the ground. The terms "upstream" and "downstream" are made with reference to the general direction of crop flow along the material conveyance systems described.

Figure 1:
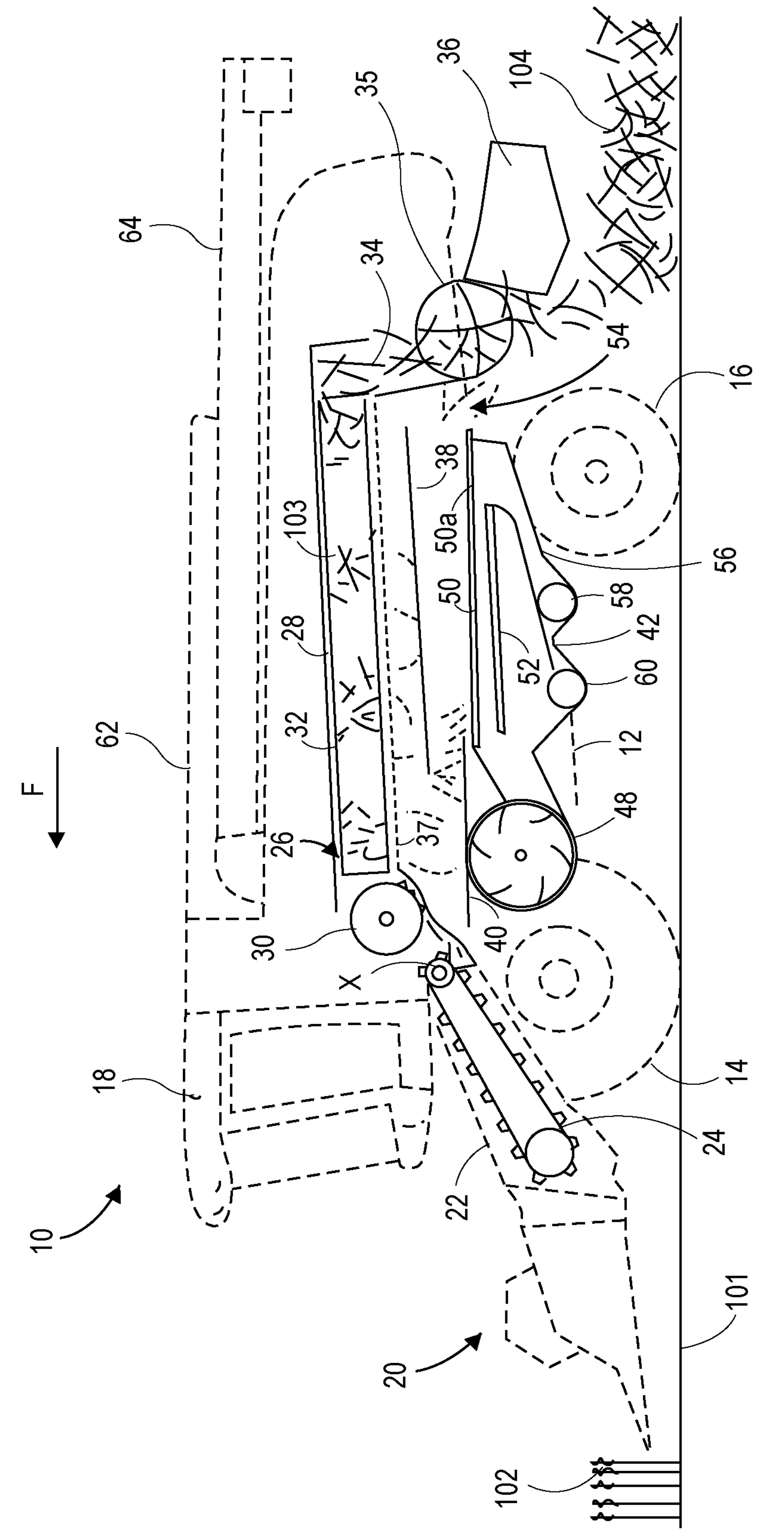
FIG. 1 shows a schematic side view of a known combine harvester comprising a residue spreader positioned after or downstream of a straw chopper.

FIG. 1 illustrates in schematic form the main components of the crop processing system of a combine harvester 10 and will be used to explain the flow of material below. The crop processing system is shown in solid lines whilst the outline profile of harvester 10 is shown in ghost form.

Combine harvester 10, hereinafter referred to as 'combine', includes a frame 12 supported on front wheels 14 and rear steerable wheels 16 which engage the ground 101. A driver's cab 18 is also supported on the frame 12 and houses a driver's station from where a driver controls the combine 10.

A cutting header 20 is detachably supported on the front of a feeder house 22 which is pivotable about a transverse axis x to lift and lower the header 20 in a conventional manner.

The combine 10 is driven in a forward direction (arrow F) across a field of standing crop 102 in a known manner. The header 20 serves to cut and gather the standing crop material before conveying such as a crop material stream into feeder house 22. An elevator 24, normally in the form of a chain and slat conveyor or elevator as shown, is housed within the feeder house 22 and serves to convey the crop material stream upwardly and rearwardly from the header 20 to the crop processor designated generally at 26. At this stage the crop material stream is unprocessed.

The crop processor 26 of the illustrated combine 10 includes a pair of axial flow threshing and separating rotors 28 fed by a tangential flow, crop material impelling, feed beater 30. It should be appreciated however that alternative types of crop processor may be used without deviating from the scope of the invention. For example, the crop processor may instead include a conventional tangential flow threshing cylinder with a plurality of straw walkers for separation. Alternatively, a single axial-flow processing rotor may be employed.

Turning back to FIG. 1, the feed beater 30 rotates on a transverse axis and comprises crop engaging deflectors (not shown) which convey the crop material stream under the beater and into rotor housings 32 which each house one of said rotors 28. It should be appreciated that only the left-hand rotor 28 and housing 32 is shown in FIG. 1 whereas the right-hand equivalent is hidden from view.

The rotors 28 are positioned to have a generally longitudinal, or fore and aft, rotation axis which is normally inclined upwardly towards the rear of the combine 10.

Flighting elements (not shown) provided on the front end of each rotor 28 engage the crop material stream which is then conveyed as a ribbon or mat 103 in a generally rearward axial and helical path in the space between the rotor 28 and the rotor housing 32.

The axial flow rotors 28 serve to thresh the crop stream in a front region, separate the grain therefrom in a rear region, and eject the straw residue via a straw discharge chute 34 provided below a rear portion of the rotors 28, the straw falling either directly onto the ground in a windrow, or via a straw chopper 35 and straw spreader 36 to be described in more detail later.

A part-cylindrical grate 37 provided in the underside of each rotor housing 32 allows the separated material to fall by gravity onto either a return pan 38 located below a rear section of the processor 26, or directly onto a stratification pan 40 located below a front section of the processor 26. In reality the separated material falling through the grate 37 is typically a mix of grain and material other than grain (MOG) which may include chaff, tailings and some straw.

The return pan 38 and stratification pan 40 together serve as a material conveyance system arranged to convey the separated crop material to a grain cleaning shoe designated generally at 42. The pans 38,40 each include a respective linkage (not shown) to convert a torque source into oscillating motion to oscillate the pans in a generally fore and aft direction. Combined with a transversely rippled or corrugated floor, the oscillating movement of the return pan 38 and stratification pan 40 propels the material generally forwardly or rearwardly respectively.

The return pan 38 "returns" the separated material incident thereon towards the front of the combine 10 (in the direction F) to a front discharge edge 44 from where the material falls or cascades onto the stratification pan 40. The material on the stratification pan 40 is conveyed rearwardly to a rear discharge edge 46 from where the material falls into the cleaning system or "shoe" 42.

The grain-MOG mix falls from the rear discharge edge 46 into the cleaning shoe 42 where the cascading mix is subjected to a cleaning airstream generated by fan 48, before falling onto the front of upper sieve or chaffer 50.

Chaffer 50 comprises adjustable louvres supported on a frame which is driven in fore-and-aft oscillating manner. The material which settles on the chaffer 50 is conveyed in a generally rearward direction and the heavier smaller grain-rich material passes between the louvres onto an underlying lower sieve 52, whereas the lighter larger material (mostly chaff) passes to the end of the chaffer and out of the rear of the machine at shoe outlet 54. A rear section of chaffer 50*a* is commonly independently adjustable and is configurable to allow tailings to pass there through into a re-threshing region 56 from where the tailings are conveyed via a re-threshing auger 58 back to the processor 26.

Lower sieve 52 is also driven in an oscillating manner to convey the collected grain-MOG mix rearwardly wherein the material falling there through is collected by a clean grain auger 60 for conveyance to an elevator (not shown) for onward conveyance to a grain tank 62. Material which does not pass through lower sieve 52 and is instead conveyed off the rear edge thereof falls into re-threshing region 56 for subsequent re-threshing.

The airstream generated by fan unit 48 is also conveyed by ducting up through lower sieve 52 and chaffer 50 to encourage lifting of the MOG from the chaffer surface.

For completeness the combine 10 includes an unloading system which includes an unloading auger 64.

Figure 2:
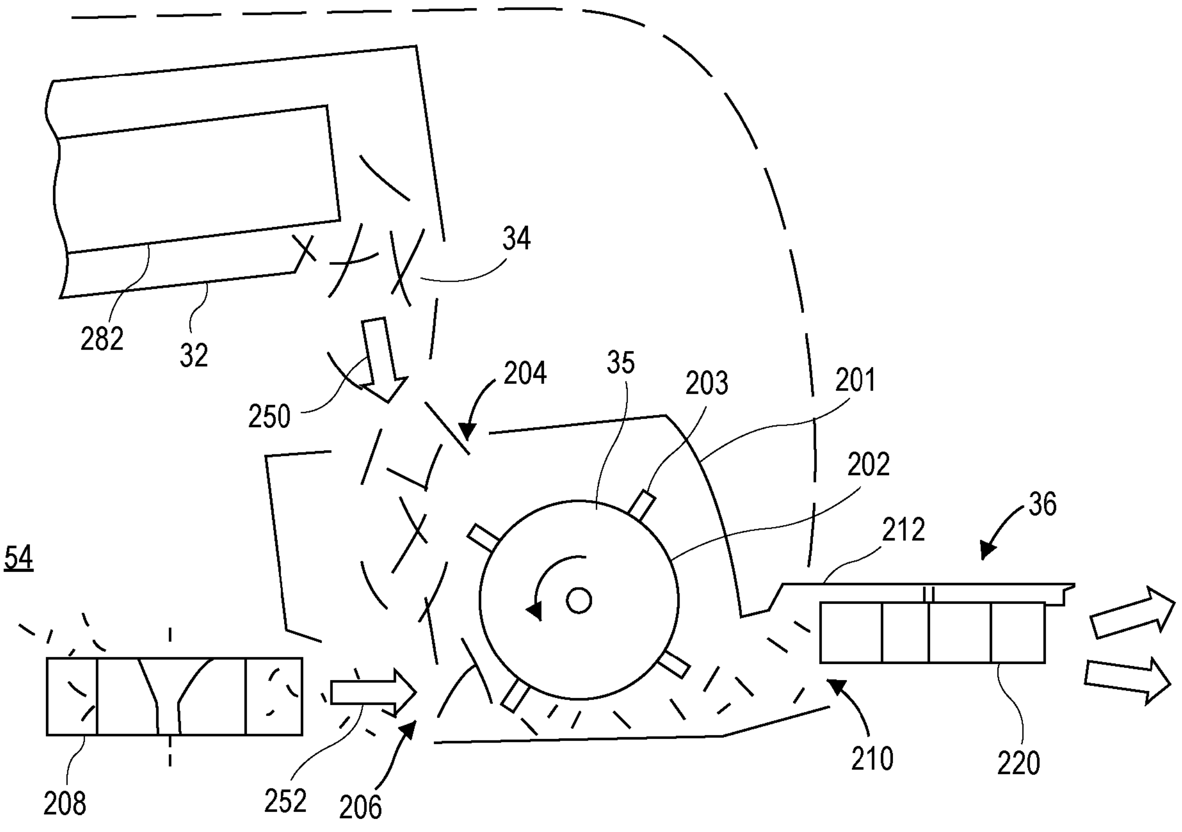
FIG. 2 shows an enlarged schematic side view of a residue handling system located at the rear of an agricultural harvester in accordance with an embodiment.

Aspects of the invention relate to the handling of the crop residue ejected by the straw chopper 35 and in particular to the straw spreader 36. FIG. 2 shows the passage of straw dropped by the processing rotors 28 and of the chaff from the shoe outlet 54.

The straw chopper 35 has a housing 201 inside which a chopper drum 202 is journaled for rotation on a transverse axis. The chopper drum 202 has sets of knives 203 pivotally mounted to the circumferential surface, the knives 203 interacting with stationary knives (not shown) to chop the material. An upper part of the housing 201 is formed with a first inlet 204 for reception of threshed crop residue (usually and mostly straw) falling from the rear of crop processing rotors 28L, 28R, indicated by arrow 250. Whilst it should be appreciated that only the left-hand rotor 28L can be seen in FIG. 2, both rotors 28L, 28R can be viewed from above in FIG. 3.

A front region of the housing 201 is optionally provided with a second inlet 206 for reception of chaff either directly from the shoe outlet 54 or via a chaff spreader 208 as is known in the art, for example as disclosed in U.S. Pat. No. 6,908,379. The movement of chaff from chaff spreader 208 through the second inlet 206 is indicated by arrow 252.

The residue entering the housing 201 is conveyed tangentially around and under the chopper drum 202, is chopped by the knives 203, and is expelled through an elongate transverse outlet 210 provided in a rear lower region of the housing 201.

The residue is directed from the transverse outlet 210 to a crop residue spreader arrangement 36. The crop residue spreader arrangement 36 comprises counter rotating left and right hand residue spreader wheels 220,222, with each residue spreader wheel having an associated shaped residue deflector 230,232. The residue spreader wheels 220,222 are supported on a frame 302. The frame 302 is connected to the chassis 12 in any suitable manner.

Each residue spreader wheel 220,222 comprises a driven rotatable vane mounted in a housing 304. The vane has a number of arms in the form of paddles 300 adapted for rotation about a central generally vertical axis. The housing 304 provides an inlet whereby chopped residue is introduced to the residue spreader wheel 220,222 and an outlet from which the chopped residue is directed in a generally rearward direction of flow out behind the combine harvester 10 on to the ground 101. First and second residue deflectors 230,232 are mounted on the frame 302 adjacent the respective residue spreader outlets. Each of the first and second residue deflectors 230, 232 comprises a plurality of individually vertically displaceable elements 310.

Each of the vertically displaceable elements 310 is mounted for movement within a vertical channel 312. Each channel 312 is mounted on a subsidiary portion 314 of the frame 302 adjacent an upper lip of the associated residue spreader wheel 220,222.

Each subsidiary frame portion 314 corresponds. Each subsidiary frame portion 314 comprises a curved member 316 to which the vertical channels 312 are secured. The curved member 316 is provided with supports which connect the curved member 316 to the frame 302. Conveniently two such supports 318,320 are provided. The curved member 316 conveniently extends around a 90 degree arc.

In the illustrated embodiment of FIGS. 3 to 6, five vertical channels 312 and associated vertically displaceable elements 310 are provided. In the illustrated embodiment of FIG. 8, seven vertically displaceable elements 310 are provided. However, other numbers of channels and associated vertically displaceable elements may be provided. Fewer channels and associated vertically displaceable elements will limit the ability to alter the desired shape of the overall residue deflector. A greater number will add to the complexity of the design.

Conveniently, each vertically displaceable element 310 is guided within its vertical guide channel 312 by one or more sets of rollers 322. The rollers 322 may conveniently be mounted on bearings adjacent the vertical guide channel 312.

Movement of the vertically displaceable elements 310 may be achieved in any suitable manner.

In the illustrated example, each vertically displaceable element 310 is mounted on a suitable actuator 324, for example a hydraulic or pneumatic actuator. In the illustrated embodiment, a linear electric actuator is used. In this way vertical adjustment of each vertically displaceable element 310 may be achieved in a timely manner.

Alternatively, two or more vertically displaceable elements 310 may be associated with a single actuator 324. However, it will be understood that this will limit the flexibility in providing a desired profile for the residue deflector.

The actuators 324 are individually controlled. Control may be by way of manual or automated control.

By adjusting the vertical position of each of the vertically displaceable elements 310 a desired residue deflector profile may be obtained that best suits the desired spreading characteristic for each harvesting situation.

Figure 3:
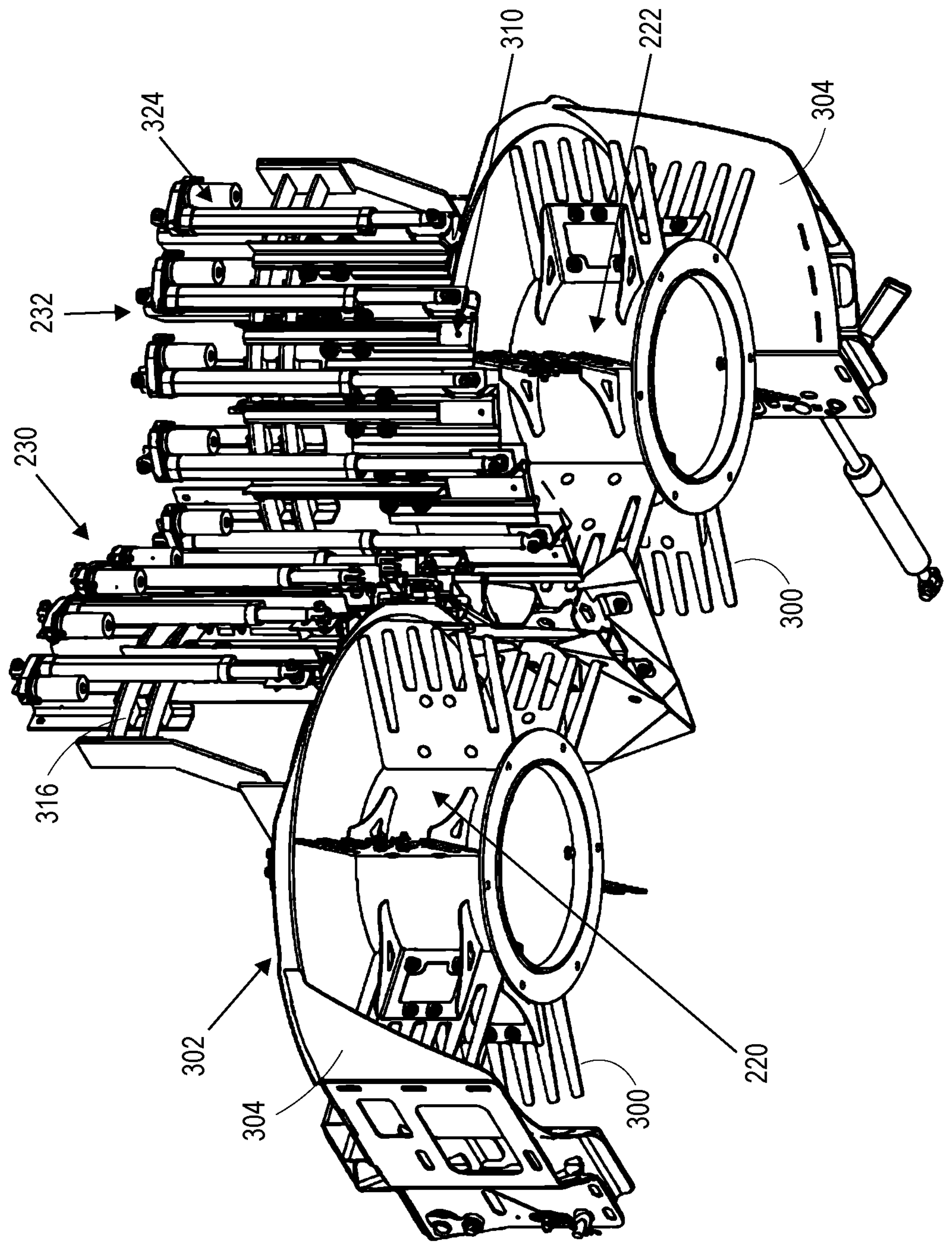
FIG. 3 shows a perspective view of a crop residue spreader arrangement according to the present invention.
Figure 4:
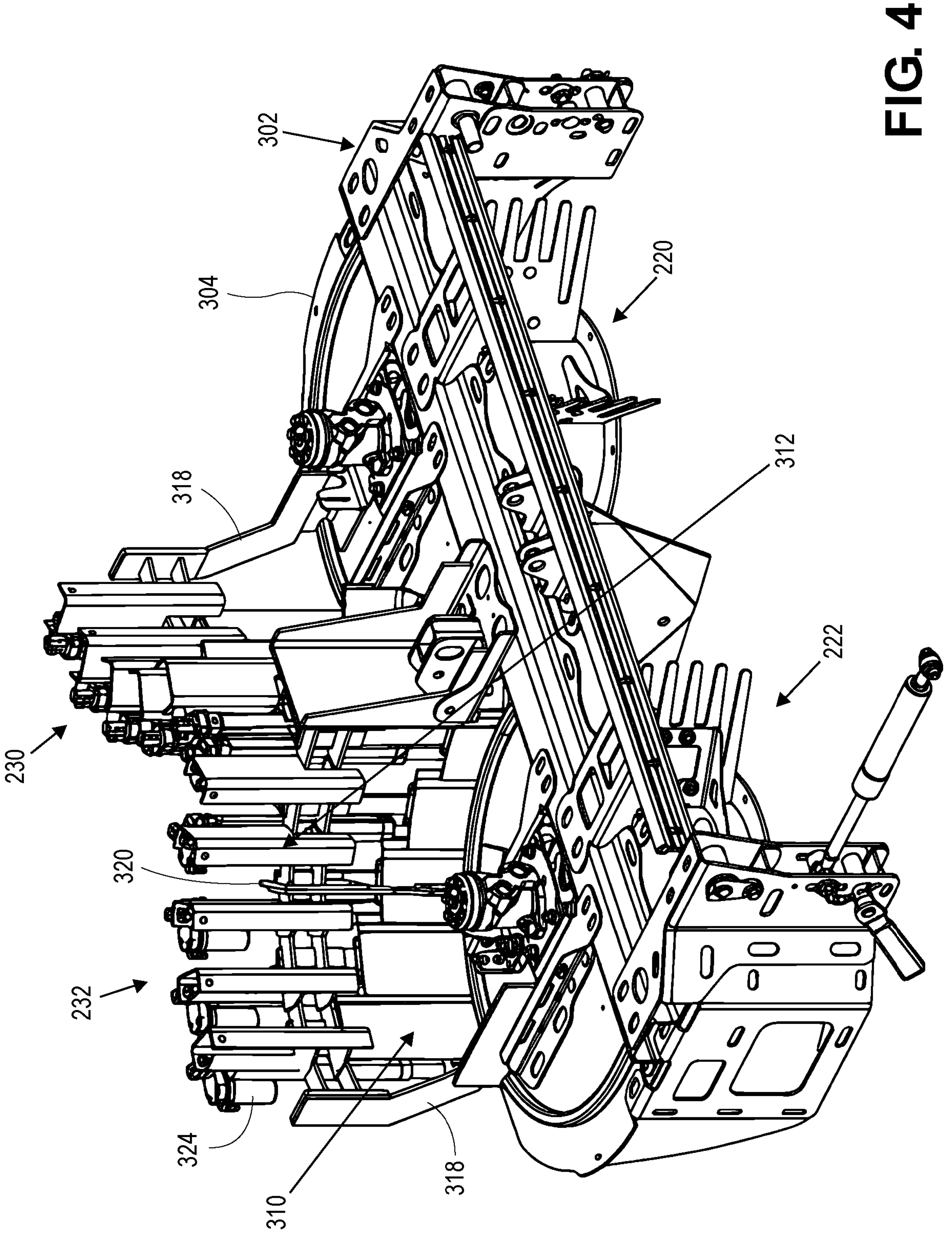
FIG. 4 shows a second perspective view of a crop residue spreader arrangement according to the present invention.
Figure 5:
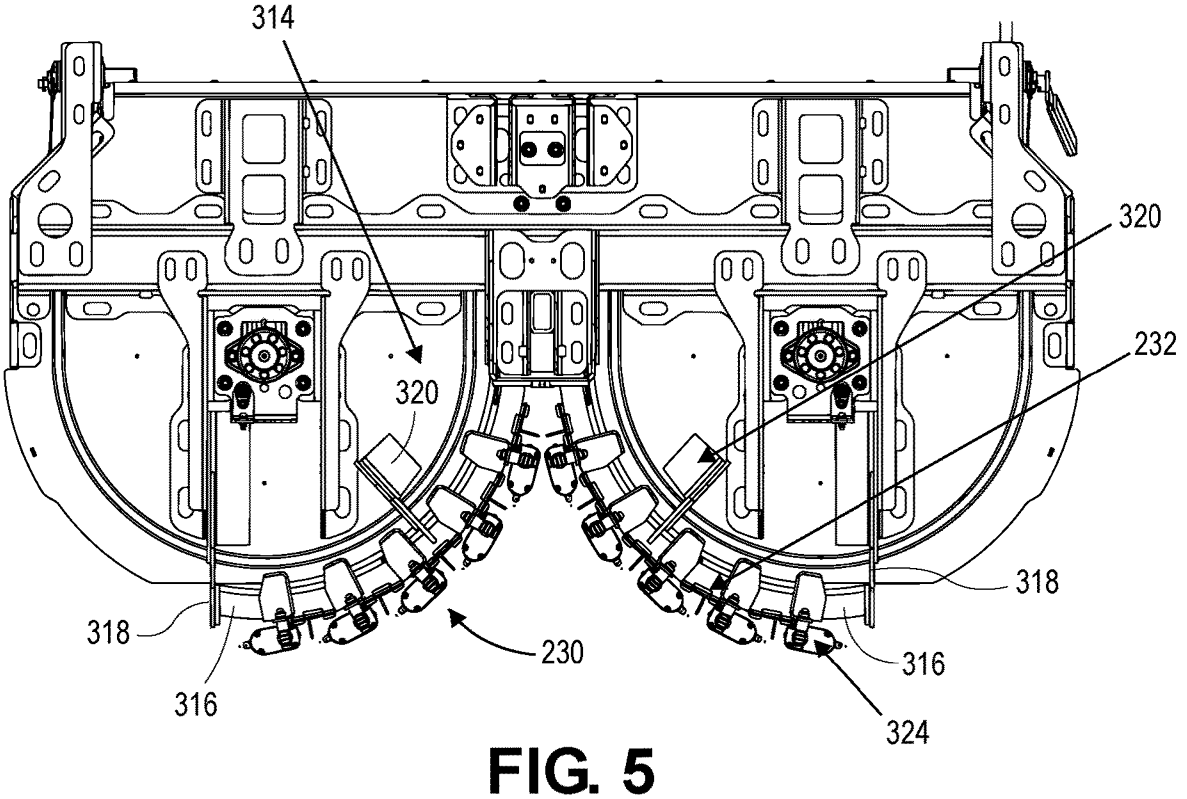
FIG. 5 shows a plan view of the crop residue spreader arrangement of FIG. 3.
Figure 6:
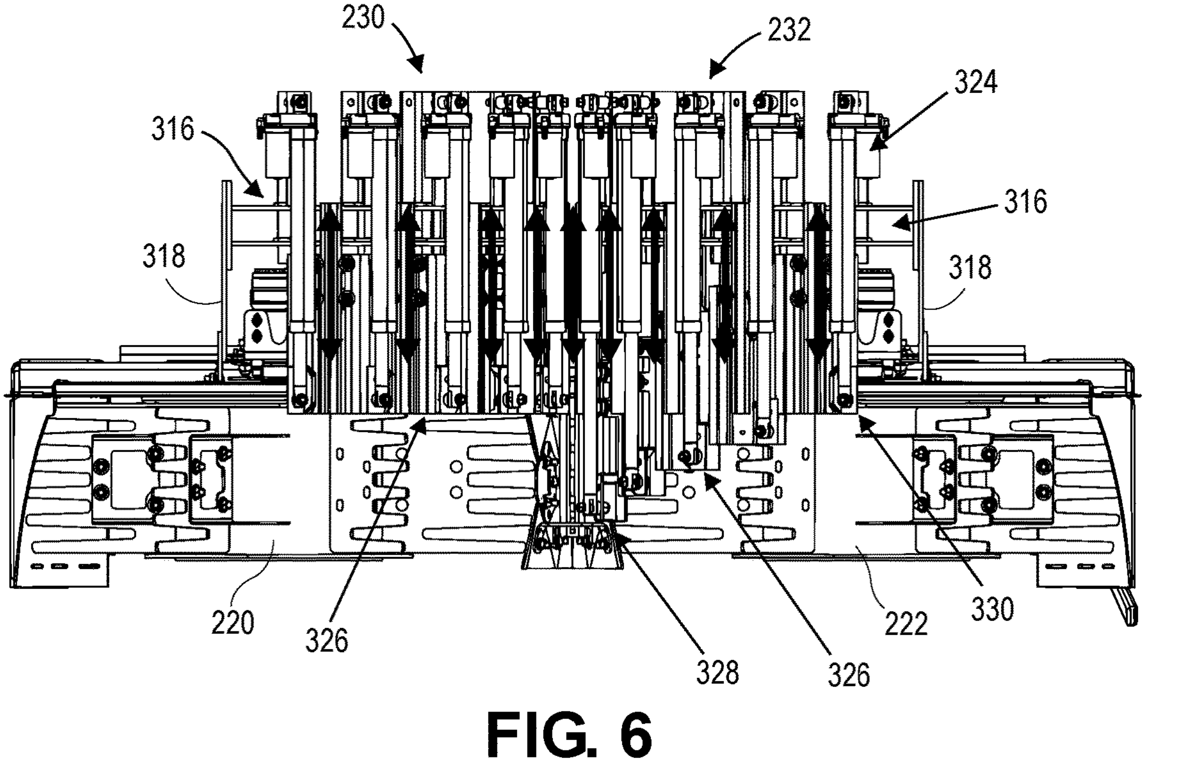
FIG. 6 shows an end view of the crop residue spreader arrangement of FIG. 3.
Figure 7:
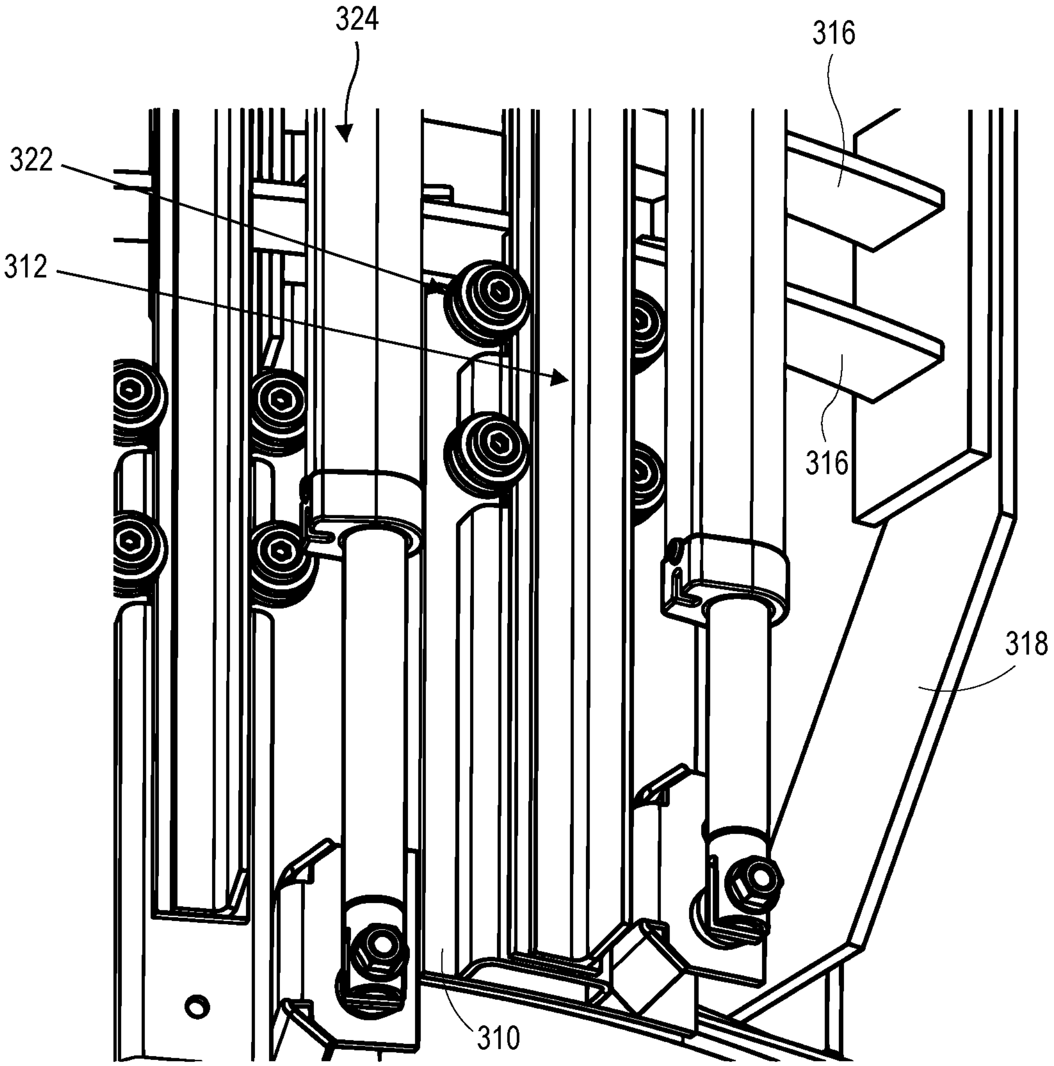
FIG. 7 shows a detail of vertically displaceable elements forming part of a residue deflector.

The left hand sides of FIGS. 3, 5 and 6 show the vertically displaceable elements 310 in a neutral position in which a lower edge 326 of the left hand residue deflector is raised above the residue spreader outlet. In other words the left hand residue deflector has a horizontal profile level with the upper lip of the residue spreader outlet.

The right hand side of FIGS. 3, 5 and 6 show the vertically displaceable elements 310 displaced so as to provide a gradient profile to the lower edge 326 of the right hand residue deflector, which is more closed at the beginning 328 of material discharge and more open at the end 330 of material discharge.

By providing automated control of the actuators 324, the shapes of the respective residue deflectors 230,232 may be dynamically controlled and changed at any time during the harvesting process.

Figure 8:
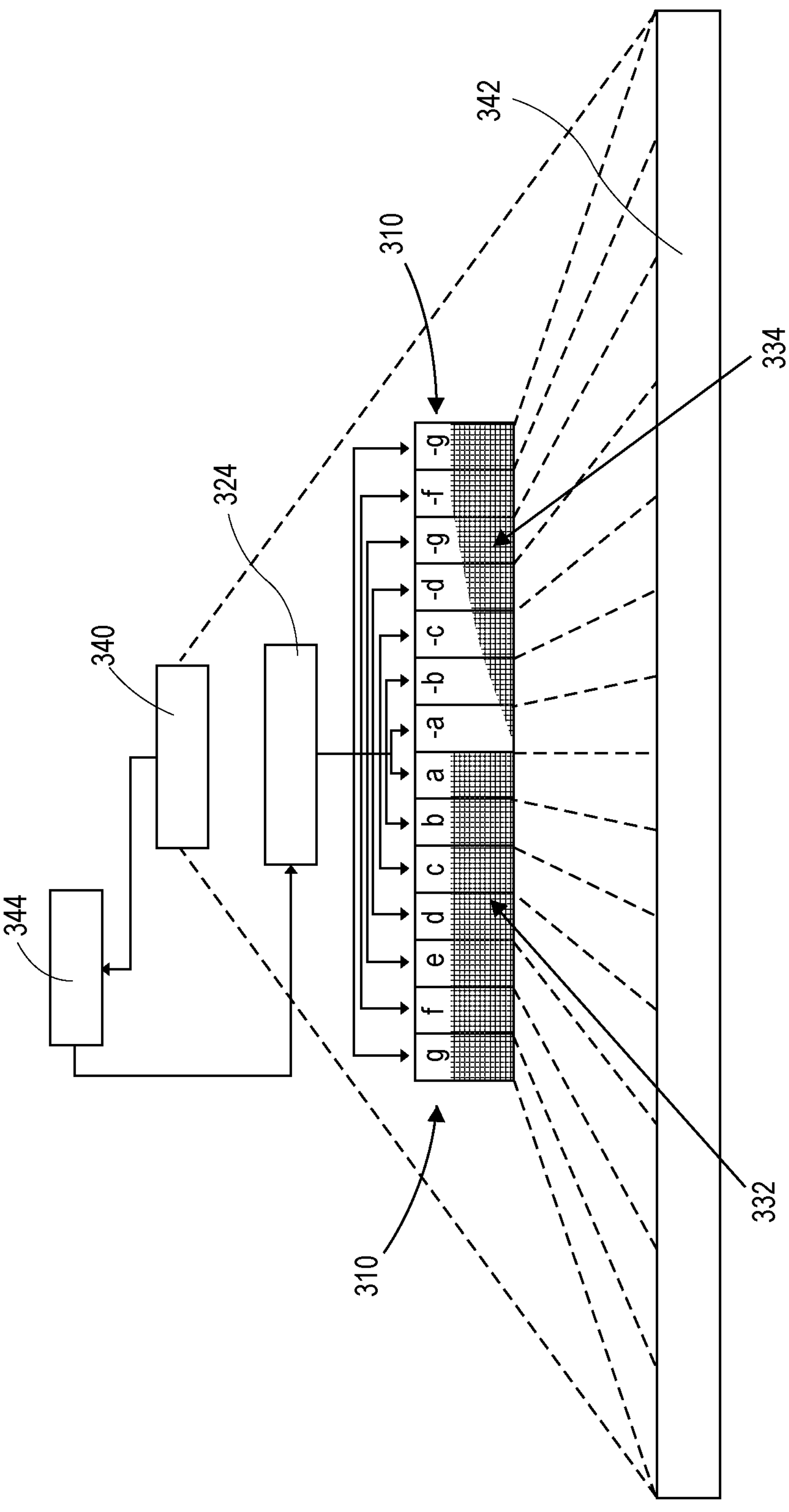
FIG. 8 shows a diagrammatic representation of elements of a control system for the crop residue spreader arrangement.

FIG. 8 shows in schematic form a plurality of sensors 340 associated with the crop residue spreader arrangement. The sensors 340 may be mounted on the frame 302 of the crop residue spreader arrangement or elsewhere on the harvester. The sensors 340 may comprise one or more of: an optical sensor, a lidar scanner, a radar scanner, or a laser scanner.

Each sensor 340 is directed to provide a signal representative of a spreading characteristic of the crop residue in a region 342 behind the crop residue spreader arrangement associated with one of the individual vertically displaceable elements 310.

In the illustrated example of FIG. 8, each crop residue deflector comprises seven vertically displaceable deflector elements 310. Each vertically displaceable deflector element 310 can be actuated in order to place more or less crop residue (straw) into the region 342 behind the harvester associated with that vertically displaceable deflector element 310.

Signals for each sensor 340 are provided as inputs to a control system comprising an electronic controller 344. The electronic controller 344 has access to a memory 346 and executes instructions stored therein to perform the steps and functionality of the present invention discussed herein, in particular to control operation of each actuator 324 to obtain a desired spread of crop residue.

The electronic controller 344 is operable to receive sensor data via inputs which, in the illustrated embodiment, takes the form of input signals received from the sensors 340 and are provided from the sensors 340 to the electronic controller 344 by way of any suitable electronics communication network 348. Utilising this data, the electronic controller 344 is configured to analyse the data and determine therefrom a crop residue characteristic associated with the crop residue deposited by the crop residue spreader arrangement.

Figure 10:
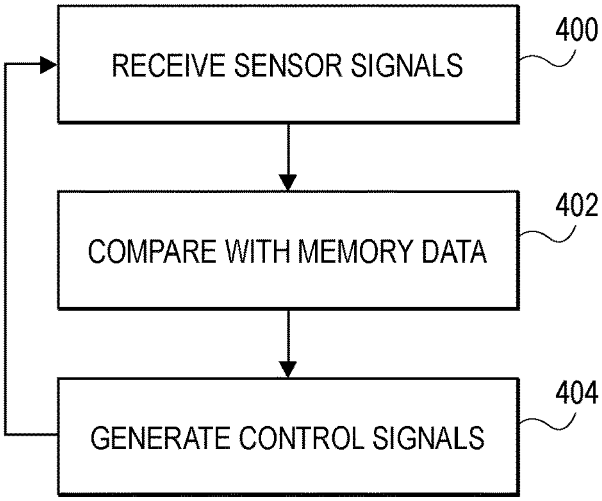
FIG. 10 shows a flow chart of the operation of a control system for the crop residue spreader arrangement.

As discussed herein, the determined crop residue characteristic is used to implement a desired spreading strategy for the crop residue spreader arrangement, and in particular adjusting as required the position of the individual vertically displaceable elements 310 of each crop residue deflector. This is achieved by the electronic controller 344 receiving the input signals for the sensors 340 (step 400, FIG. 10), comparing the detected crop residue characteristic from each sensor 340 with a predetermined crop residue characteristic in the memory 346 associated with the desired spreading strategy for the region analysed by each sensor 340 (step 402) and generating appropriate control signals for the associated actuators 324 to adjust, as required, the crop residue being directed to each region (step 404). This method is repeated as the harvester is driven across a field of standing crop 102.

The left-hand sides of FIG. 8 show the vertically displaceable elements 310 in a neutral position in which a lower edge of the left-hand residue deflector is raised above the residue spreader outlet. In other words the left-hand residue deflector has a horizontal profile level with the upper lip of the residue spreader outlet and the crop residue is spread unobstructed through the outlet region of the residue spreader wheel 220, that is through the largest possible region of material discharge 332.

The right-hand side of FIGS. 3, 5 and 6 show the vertically displaceable elements 310 displaced so as to provide a gradient profile to the lower edge of the right-hand residue deflector and so creates a shaped region of material discharge 334 which is more closed at the beginning of material discharge and more open at the end of material discharge.

Figure 9:
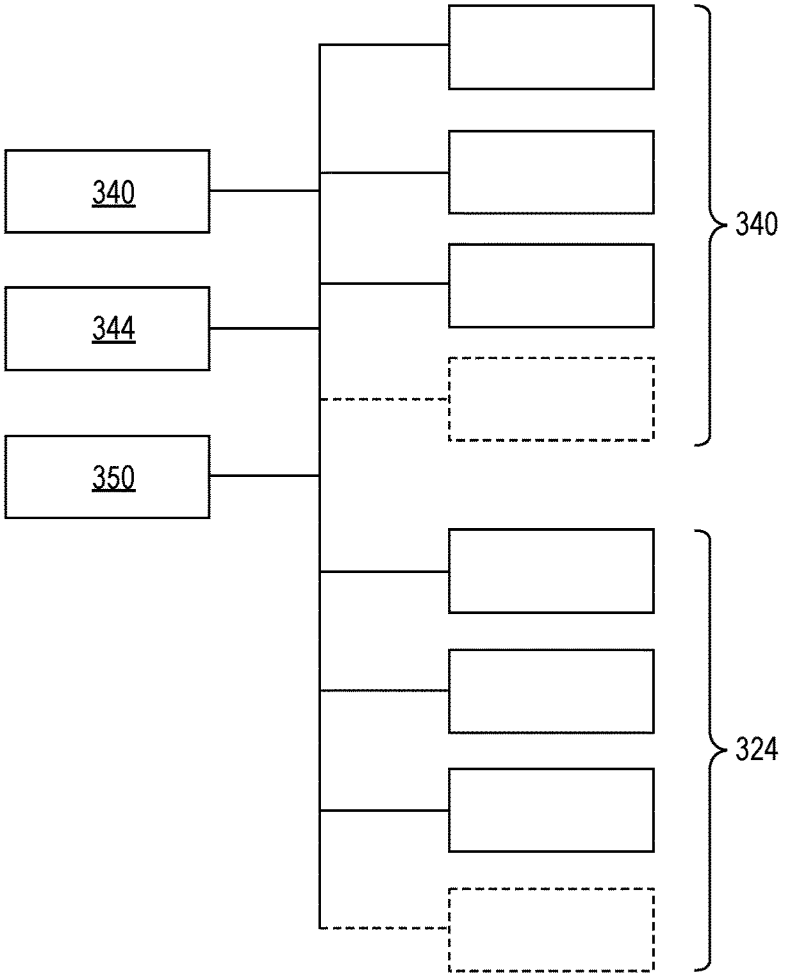
FIG. 9 shows a schematic diagram illustrating electrical components of a control system for the crop residue spreader arrangement.

The harvester may further be provided with a user interface 350 (FIG. 9), for example within the driver's cab 18 of the combine harvester. The user interface 350 may include a display for viewing by the operator. The electronic controller 344 may control operation of the user terminal to cause information indicative of the spreading strategy to be communicated to the operator, for example by way of a GUI on the display.

All references cited herein are incorporated herein in their entireties. If there is a conflict between definitions herein and in an incorporated reference, the definition herein shall control.

From reading the present disclosure, other modifications will be apparent to persons skilled in the art. Such modifications may involve other features which are already known in the field of combine harvesters and component parts therefore and which may be used instead of or in addition to features already described herein.

What is claimed is:

1. A control system for controlling operation of a plurality of operational components of a crop residue spreader arrangement of an agricultural harvester, the control system comprising one or more controllers, and being configured to:

receive data indicative of a detected distribution of crop residue located on the ground behind the crop residue spreader arrangement;

determine, in dependence on the detected distribution, a spreading strategy for operation of the plurality of operational components of the crop residue spreader arrangement, and control the plurality of operational components of the crop residue spreader arrangement in dependence on the determined spreading strategy, wherein the plurality of operational components comprises a plurality of actuators, each actuator for displacing one of a first plurality of vertically displaceable elements of a first residue deflector associated with a first residue spreader wheel and one of a second plurality of vertically displaceable elements of a second residue deflector associated with a second residue spreader wheel, and wherein the control system is configured to generate and output one or more control signals for individually controlling operation of each of the plurality of actuators in accordance with the determined spreading strategy.

2. The control system according to claim 1 wherein the plurality of operational components may additionally comprise a user interface.

3. The control system according to claim 2, wherein the control system is configured to generate and output one or more control signals for controlling operation of the user interface to display the determined spreading strategy to an operator of the agricultural harvester.

4. The control system according to any of claim 1, wherein the control system is configured to:

receive sensor data from sensors associated with the crop residue spreader arrangement; and determine a spreading characteristic of the crop residue in dependence thereon.

5. The control system according to claim 4, wherein the sensors comprise one or more of an optical sensor, a lidar scanner, a radar scanner, or a laser scanner.

6. The control system according to claim 4, wherein the sensors are mounted or otherwise coupled to the crop residue spreader arrangement or the agricultural harvester and configured to monitor crop residue spread by the crop residue spreader arrangement.

7. A system, comprising:

a crop residue spreader arrangement; and a control system according claim 1 configured to control operation of the crop residue spreader arrangement in accordance with a determined spreading strategy.

8. An agricultural harvester comprising a control system as described in claim 1.

9. A method of controlling operation of a plurality of operational components of an agricultural harvester, comprising:

receiving data indicative of a spreading characteristic of crop residue deposited by the agricultural harvester;

determining, in dependence on the spreading characteristic, a spreading strategy for depositing the crop residue, the spreading strategy including an indication of the spreading strategy; and controlling the plurality of operational components associated with the agricultural harvester in dependence on the determined spreading strategy, wherein the plurality of operational components comprises a plurality of actuators, each actuator for displacing one of a first plurality of vertically displaceable elements of a first residue deflector associated with a first residue spreader wheel and one of a second plurality of vertically displaceable elements of a second residue deflector associated with a second residue spreader wheel, and wherein the method includes generating and outputting one or more control signals for individually controlling operation of each of the plurality of actuators in accordance with the determined spreading strategy.

10. The method according to claim 9, wherein the plurality of operational components may additionally comprise a user interface.

11. The method according to claim 10, wherein the user interface is operable to provide information indicative of the determined spreading strategy to an operator of the combine harvester.

12. The method according to claim 11, wherein the method includes controlling operation of the user interface to display the determined spreading strategy to an operator of the agricultural combine harvester.

13. The method according to claim 9, wherein the method includes:

receiving sensor data from sensors associated with the agricultural harvester; and determining a spreading strategy of the crop residue in dependence thereon.

14. A non-transitory computer readable storage medium comprising computer software comprising computer-readable instructions which, when executed by a processor, cause performance of a method in accordance with claim 9.

* * * * *